Oct. 4, 1960    H. M. SCOTT    2,955,200
MULTIVIBRATOR WITH RESET TIMING CIRCUIT
Filed Sept. 16, 1953
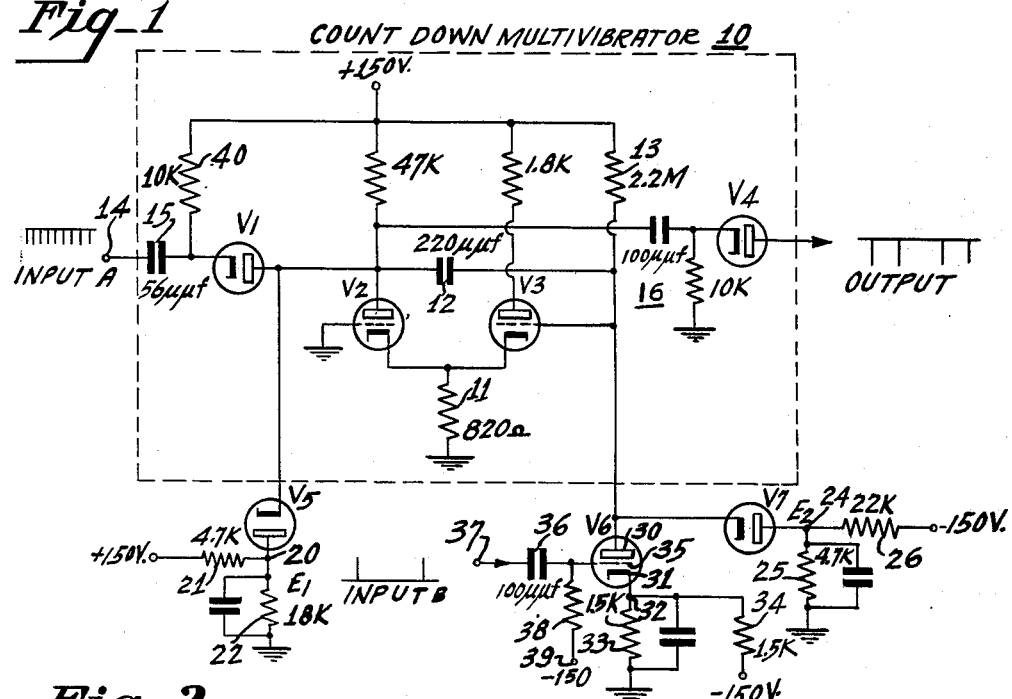
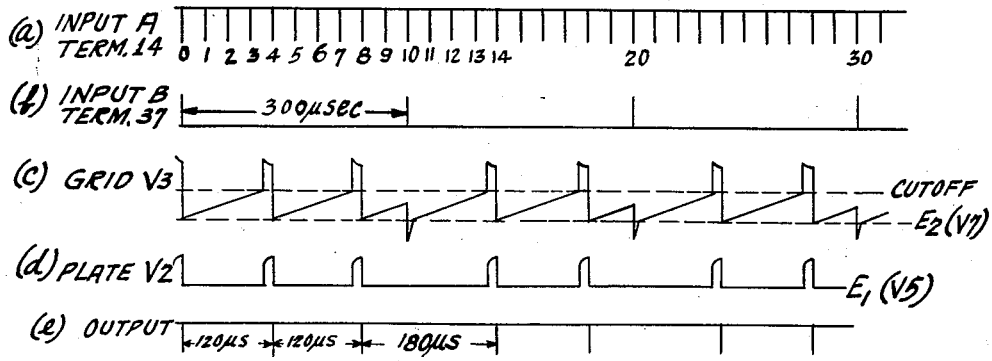
INVENTOR.
Howard M. Scott
BY Charles H. Brown
ATTORNEY

United States Patent Office 2,955,200
Patented Oct. 4, 1960

2,955,200
MULTIVIBRATOR WITH RESET TIMING CIRCUIT

Howard M. Scott, Philadelphia, Pa., assignor to Radio Corporation of America, a corporation of Delaware Filed Sept. 16, 1953, Ser. No. 380,387

9 Claims. (Cl. 250—27)

This invention relates to a multivibrator having a quasi-stable or active state lasting for a period of time determined by a timing circuit, and means to reset the timing circuit to prolong the quasi-stable state.

In pulse systems, such as television grating generators, television synchronizing generators, decade counters and radars, it is often desirable to generate a pulse wave wherein the period between successive pulses varies according to a cyclical scheme. It is a general object of this invention to provide a generator of such a pulse wave.

It is another object to provide an improved reset multivibrator which is stabilized against changes in tubes and power supply variations.

In one aspect, the invention comprises a cathode coupled multivibrator including first and second vacuum tubes. The plate of the first tube is coupled through a timing circuit to the grid of the second tube. Clamping circuits including diodes determine the minimum potential to which the plate of the first tube and the grid of the second tube may go. After the second tube is cut-off by a trigger pulse, the tube remains in this quasi-stable state for a period of time determined by the timing circuit. A third triode vacuum tube coupled to the timing circuit is operative to reset the timing circuit to its initial condition when a trigger wave is applied to the grid of the third tube. The trigger pulse wave applied to the grid of the third tube has a period which is an integral multiple of the period of the trigger pulse wave applied to the multivibrator.

These and other objects and aspects of the invention will be apparent to those skilled in the art from the following more detailed description taken in conjunction with the appended drawings wherein:

Fig. 1 is a circuit diagram of one form of the invention; and

Fig. 2 is a chart of voltage wave forms at identified points in the circuit of Fig. 1.

Fig. 1 shows a conventional count down multivibrator 10 enclosed within a dotted line box. The term "tube" as used herein is intended to include an electron discharge electrode structure in an evacuated envelope which may also enclose another electrode structure. The multivibrator includes tubes V2 and V3 having a common cathode resistor 11. A timing circuit includes a capacitor 12 coupling the plate of tube V2 to the grid of tube V3 and a resistor 13 coupling the grid of tube V3 to the plate voltage supply. Negative trigger pulses from input terminal 14 are coupled through coupling capacitor 15, and diode V1 to the plate of tube V2, and then through capacitor 12 to the grid of tube V3. An output is derived from the plate of tube V2 by a coupling through a differentiating circuit 16 and a diode V4.

In the operation of the count down multivibrator 10, tube V2 is normally cut off and tube V3 is normally conducting. When a negative trigger pulse is applied to the multivibrator from input terminal 14, the current passing states of the two tubes are reversed so that tube V3 is cut off and tube V2 is conducting. This quasi-stable state exists for a period of time determined by the time constant of the circuit including timing capacitor 12 and timing resistor 13. The end of the quasi-stable state occurs when the potential on the grid of tube V3 rises to the cut-off potential of the tube. When this occurs, tube V3 starts conducting and causes an increased voltage drop across the common cathode resistor 11 so that the potential on the cathodes of tubes V2 and V3 rises until tube V2 is cut off.

The plate of tube V2 is connected through a diode V5 to the junction point 20 between voltage divider resistors 21 and 22. The terminals of the voltage divider are connected across a source of uni-directional potential (not shown). The negative terminal of the power supply is connected to ground. The polarity of diode V5 is arranged so that the potential on the plate of tube V2 cannot fall below the potential $E_1$ at junction point 20 of the voltage divider. The grid of tube V3 is connected through a diode V7 to the junction point 24 between voltage divider resistors 25 and 26. The terminals of the voltage divider are connected to the terminals of a source of uni-directional potential (not shown). The positive terminal of the source is connected to ground. The polarity of diode V7 is arranged so that the potential on the grid of tube V3 cannot fall below the potential $E_2$ existing at the junction point 24 of the voltage divider.

The grid of tube V3, and the junction point between timing capacitor 12 and timing resistor 13, are connected to the plate 30 of a triode vacuum tube V6. The cathode 31 of tube V6 is connected to the junction point 32 between voltage divider resistors 33 and 34. The free end of resistor 34 is connected to the negative terminal of a source of uni-directional potential (not shown). The free end of resistor 33 and the positive terminal of this last source of potential are connected to ground. The grid 35 of tube V6 is connected through a coupling capacitor 36 to a trigger pulse input terminal 37, and through a grid bias resistor 38 to the negative terminal 39 of a source of uni-directional potential.

The time periods between successive output pulses from the circuit of Fig. 1 are determined by the periods of the trigger pulse waves applied to input terminals 14 and 37, and also by the time constant of timing circuit 12, 13. The waveforms of Fig. 2 show, by way of example, the nature of the output pulse wave under certain conditions. It is apparent from waveforms $a$ and $b$ of Fig. 2 that negative trigger pulses are applied to input terminal 14 and that positive trigger pulses occurring coincident with every 10th negative trigger pulse are applied to input terminal 37. It is apparent from waveform $c$ of Fig. 2 that the potential on the grid of tube V3 rises exponentially from a potential $E_2$ to the cut-off potential of the tube in a period of time equal to between three and four periods of the trigger pulse wave applied to input terminal 14.

In the operation of the circuit of Fig. 1, the negative trigger pulse applied to input terminal 14 and labeled 0 in Fig. 2 renders tube V3 cut off and tube V2 conductive. The following negative trigger pulse labeled 1 has no effect on the conductivity of tubes V2 and V3 because they are not passed through tube V1. Tube V1 cannot pass the negative trigger pulses because its anode (tied to the plate of tube V2) is at a much lower potential than its cathode which is returned through resistor 40 to B+. Likewise negative triggers 2 and 3 of waveform $a$ in Fig. 2 have no effect on the quasi-stable state of multivibrator tubes V2 and V3. Tube V3 remains cut off until the timing circuit 12, 13 causes the potential on its grid to rise to the cut-off potential of the tube. This occurs at a time between input pulses labeled 3 and 4.

As soon as tube V3 starts conducting, a rapid regenerative transition takes place after which tube V3 is fully conductive and tube V2 is cut off. The duration of the quasi-stable or active state is stabilized against variations in the tubes V2 and V3 by reason of the action of diodes V5 and V7 in clamping the minimum potentials on the plate of tube V2 and the grid of tube V3 respectively.

Following the quasi-stable state, the multivibrator remains in its fully stable state until negative trigger pulse 4 is applied to input terminal 14. Waveforms c and d show that during the fully stable state, positive pulses are present on the grid of tube V3 and on the plate of tube V2. Negative trigger pulse 4 passes through tube V1 to reverse the conductivity states of tubes V2 and V3; the negative trigger pulse can pass through tube V1 because the plates of tubes V1 and V2 are then at a sufficiently positive value to permit conduction in tube V1. The positive pulse (waveform d of Fig. 2) on the plate of tube V2, in passing through differentiator circuit 16 and diode V4, results in a negative output spike (waveform e of Fig. 2) corresponding in time with the trailing edge of the positive pulse on the plate of tube V2. The quasi-stable state initiated by negative input trigger pulse 4 continues until a time between negative input trigger pulses 7 and 8 when the timing circuit 12, 13 again restores the multivibrator to its fully stable state. When negative trigger pulse 8 is applied, the multivibrator is shifted again to its quasi-stable or active state and another timing cycle is initiated. As thus far described, the multivibrator acts as a count down multivibrator to generate one output pulse for every four negative input pulses applied to terminal 14.

It will be seen by reference to waveform b of Fig. 2 that a trigger pulse wave is applied to input terminal 37 having positive pulses coinciding in time with every 10th negative pulse of the trigger wave applied to input terminal 14. During the quasi-stable state, a positive pulse is applied to input terminal 37 at the same time that a negative trigger pulse 10 is applied to the input terminal 14. The negative trigger pulse 10 has no effect on the operation of the multivibrator at this particular time because it cannot pass through diode V1 since the anode of the diode is at a potential relatively low compared with the cathode. (Tube V2 is now conducting.) The positive trigger pulse applied to input terminal 37 and through coupling capacitor 36 to the grid 35 of tube V6 causes tube V6 to conduct heavily. In the absence of a positive pulse to the grid of tube V6, this tube will be cut off by the negative bias on its grid. When tube V6 conducts, the voltage drop across plate resistor 13 lowers the potential on the cathode of diode V7 sufficiently with respect to the potential $E_2$ on its anode so that diode V7 also conducts. Diode V5 is also conductive since it remains conductive during the quasi-stable state of the multivibrator circuit to clamp the potential on the plate of tube V2 at the voltage $E_1$ determined by voltage divider 21, 22. Therefore, timing capacitor 12 is connected on one side through the very low impedance of conducting diode V5 to the potential $E_1$, and on the other side through the very low impedance of conducting diode V7 to the potential $E_2$. In a circuit having component values as shown by way of example in Fig. 1, the potential $E_1$ may be +120 volts, and the potential $E_2$ may be −25 volts. The capacitor 12 is thus made to discharge in a very short period of time in the order of a few tenths of a microsecond, and the grid of tube V3 is reset to the potential $E_2$. This initiates a new timing cycle lasting until a time between negative pulses 13 and 14 applied to input terminal 14. Then, after the multivibrator has been in its fully stable state for a short period of time, negative trigger pulse 14 returns the multivibrator to its quasi-stable state to initiate a new timing cycle. The complete cycle of operation which has been described is then repeated.

The arrangement illustrated operates to provide an output pulse wave (waveform e of Fig. 2) having pairs of negative spikes spaced by an amount equal to the period of six negative trigger pulses applied to input terminal 14, the output spikes of each pair being separated by an interval equal to the period of four of the negative trigger pulses applied to input terminal 14. Various other output pulse waves may be generated by applying different trigger waves to input terminals 14 and 37, and by varying the time constant of the timing circuit 12, 13. The term "diode" is herein used to include not only an evacuated two-electrode structure but also other unidirectional rectifying devices such as copper oxide rectifiers and germanium diodes.

What is claimed is:

1. A reset multivibrator comprising, first and second vacuum tubes having cathode, grid and plate electrodes, a timing circuit including a storage device coupling the plate of said first tube to the grid of said second tube and a resistor coupling the grid of said second tube to a source of potential, diode means connected to the plate of said first tube to establish the minimum potential thereon, a second diode means connected to the grid of said second tube to establish the minimum potential thereon, means to apply a first pulse train to said first tube and through said device to said second tube, a third vacuum tube including cathode, grid and plate electrodes, a connection from the plate of said third tube to the grid of said second tube and to said device, and means to apply a second pulse train to the grid of said third tube to reset the timing cycle of said timing circuit by altering the potential of said device.

2. A reset multivibrator as defined in claim 1, wherein said means to apply a first pulse train to said first and second tubes includes a diode coupled from an input terminal to the plate of said first tube, and means to bias said last-mentioned diode so that said last-mentioned diode can conduct solely when said first tube is cut off.

3. A reset multivibrator comprising first and second vacuum tubes having cathode, grid and plate electrodes, a timing circuit including a storage device, means for coupling the plate of said first tube to the grid of said second tube through said storage device, a first diode having a cathode and an anode, a direct current connection from the cathode of said diode to the plate of said first tube, a source of direct current potential connected to the anode of said diode, a second diode having a cathode and an anode, a direct current connection from said last-named cathode to the grid of said second tube, a source of direct current potential connected to the anode of said second diode, means to apply an input pulse train to said first tube and through said device to said second tube, a third vacuum tube having a cathode, a grid and a plate, a direct current connection from said last-named plate to the grid of said second tube and to said device, means to normally bias the grid and cathode of said third tube to maintain said third tube cut off, and means to apply a second pulse train to said third tube to render the tube conductive to alter the potential of said device.

4. A reset multivibrator as defined in claim 3, and in addition an output terminal and means including a differentiator circuit and a third diode coupled from the plate of said first tube to said output terminal, whereby the output wave consists of a plurality of spikes of one polarity.

5. A reset multivibrator as defined in claim 3 wherein the pulse train applied to said third tube has a repetition rate which is a submultiple of the repetition rate of said input pulse train applied to said first and second tubes.

6. A reset multivibrator comprising first and second vacuum tubes having cathode, grid and plate electrodes, a timing circuit including a capacitor and a resistance, means to couple the plate of said first tube to the grid of said second tube through said capacitor and the grid of said second tube to a source of potential through said resistance, a first diode having a cathode and an anode, a direct current connection from the cathode of said diode to the plate of said first tube and to one side of said capacitor, a source of direct current potential connected to the anode of said diode, a second diode having a cathode and an anode, a direct current connection from said last named cathode to the grid of said second tube, a source of direct current potential connected to the anode of said second diode, a third diode having a cathode and having an anode connected to the plate of said first tube, means to apply a pulse train to the cathode of said third diode, a third vacuum tube having a cathode, a grid and a plate, a direct current connection from said last named plate to the grid of said second tube and to the other side of said capacitor, means to normally bias the grid and cathode of said third tube to maintain said tube cut off, means to apply a reset pulse train to said third tube to render the tube conductive to reset the timing cycle of said timing circuit by altering the voltage developed across said capacitor, said reset pulse train having a repetition rate which is a sub-multiple of the repetition rate of said first-mentioned pulse train, an output terminal, and a differentiator circuit and a fourth diode coupled from the plate of said first tube to said output terminal.

7. A reset multivibrator as claimed in claim 6 and wherein said first-mentioned pulse train includes negative trigger pulses, and said reset pulse train includes positive trigger pulses, said positive trigger pulses of said reset pulse train being applied to the grid of said third tube by said last-mentioned means.

8. A reset multivibrator comprising, first and second current conducting devices having first, second and third electrodes, a timing circuit including a storage device coupling the first electrode of said first conducting device to the second electrode of said second conducting device and a resistor coupling the second electrode of said second conducting device to a source of potential, diode means connected to the first electrode of said first conducting device to establish the minimum potential thereon, a second diode means connected to the second electrode of said second conducting device to establish the minimum potential thereon, means to apply a first pulse train to the first electrode of said first conducting device and through said storage device to the second electrode of said second conducting device, a third current conducting device including first, second and third electrodes, a connection from the first electrode of said third conducting device to the second electrode of said second conducting device and to said storage device, and means to apply a second pulse train to the second electrode of said third conducting device to reset the timing cycle of said timing circuit by altering the potential of said storage device.

9. A reset multivibrator comprising, first and second current conducting devices having first, second and third electrodes, a timing circuit including a capacitor coupling the first electrode of said first conducting device to the second electrode of said second conducting device and a resistor coupling the second electrode of said second conducting device to a source of potential, diode means connected to the first electrode of said first conducting device to establish the minimum potential thereon and to one side of said capacitor, a second diode means connected to the second electrode of said second conducting device to establish the minimum potential thereon and to the other side of said capacitor, means to couple the third electrode of said first conducting device to the third electrode of said second conducting device, means to apply a first pulse train to the first electrode of said first conducting device and across said capacitor to the second electrode of said second conducting device, a third current conducting device including first, second and third electrodes, means to couple the first electrode of said third conducting device to the second electrode of said second conducting device and to said other side of said capacitor, means to bias the second and third electrodes of said third conducting device to hold said third conducting device inoperative, and means to apply a second pulse train having a repetition rate which is a sub-multiple of the repetition rate of said first pulse train to the second electrode of said third conducting device, said third conducting device being responsive to each pulse of said second pulse train to operate and thereby to reset the timing cycle of said timing circuit by altering the voltage developed across said capacitor.

References Cited in the file of this patent
UNITED STATES PATENTS

| 2,423,931 | Etter | July 15, 1947 |
|---|---|---|
| 2,487,191 | Smith | Nov. 8, 1949 |
| 2,494,865 | Fleming-Williams et al. | Jan. 17, 1950 |
| 2,549,505 | Mohr | Apr. 17, 1951 |
| 2,549,875 | Williams et al. | Apr. 24, 1951 |
| 2,556,934 | Mulligan et al. | June 12, 1951 |
| 2,739,238 | Bartelt | Mar. 20, 1956 |